United States Patent [19]

Kaner et al.

[11] Patent Number: 5,096,586
[45] Date of Patent: Mar. 17, 1992

[54] MEMBRANES HAVING SELECTIVE PERMEABILITY

[75] Inventors: Richard B. Kaner, Beverly Hills; Mark R. Anderson; Benjamin R. Mattes, both of Los Angeles; Howard Reiss, Encino, all of Calif.

[73] Assignee: Regents of the University of California, Oakland, Calif.

[21] Appl. No.: 573,950

[22] Filed: Aug. 28, 1990

[51] Int. Cl.[5] ...................... B01D 67/00; B01D 71/60
[52] U.S. Cl. ................................ 210/500.37; 264/41; 264/DIG. 48; 264/DIG. 62
[58] Field of Search ................ 204/59 R; 210/500.28, 210/500.37, 500.38, 500.39; 264/41, 45.1, DIG. 62, DIG. 48

[56] References Cited

U.S. PATENT DOCUMENTS

| | | |
|---|---|---|
| 3,444,286 | 5/1969 | King et al. |
| 4,026,977 | 5/1977 | Bourganel . |
| 4,175,153 | 11/1979 | Dobo et al. |
| 4,268,278 | 5/1981 | Dobo et al. |
| 4,329,157 | 5/1982 | Dobo et al. |
| 4,451,424 | 5/1984 | Tweddle et al. |
| 4,466,910 | 8/1984 | House et al. |
| 4,466,911 | 8/1984 | House . |
| 4,468,291 | 8/1984 | Naarmann et al. |
| 4,483,901 | 11/1984 | Okita et al. |
| 4,485,056 | 11/1984 | Makino et al. |
| 4,505,845 | 3/1985 | House . |
| 4,505,846 | 3/1985 | House et al. |
| 4,512,893 | 4/1985 | Makino et al. |
| 4,519,940 | 5/1985 | Schroeder et al. |
| 4,615,829 | 10/1986 | Tamura et al. |
| 4,620,943 | 11/1986 | Denisevich, Jr. et al. |
| 4,629,540 | 12/1986 | Geniges et al. .................. 204/59 R |
| 4,636,314 | 1/1987 | Beuhler et al. |
| 4,652,396 | 4/1987 | Wagener . |
| 4,692,225 | 9/1987 | Witucki et al. |
| 4,717,393 | 1/1988 | Hayes . |
| 4,717,394 | 1/1988 | Hayes . |
| 4,761,233 | 8/1988 | Linder et al. |
| 4,784,880 | 11/1988 | Coplan et al. |
| 4,798,685 | 1/1989 | Yaniger . |
| 4,800,019 | 1/1989 | Bikson et al. |
| 4,806,271 | 2/1989 | Yaniger et al. |
| 4,813,983 | 3/1989 | Nohmi et al. |
| 4,818,452 | 4/1989 | Kneifel et al. |
| 4,822,638 | 4/1989 | Yaniger . |
| 4,832,713 | 5/1989 | Yamada et al. |
| 4,851,487 | 7/1989 | Yaniger et al. |
| 4,869,384 | 8/1989 | Fibiger et al. |
| 4,973,391 | 11/1990 | Madou et al. ........................ 204/74 |
| 4,976,860 | 12/1990 | Takahashi et al. ............. 210/500.28 |

FOREIGN PATENT DOCUMENTS

| | | |
|---|---|---|
| 62-110729 | 5/1987 | Japan . |
| 1-38125 | 2/1989 | Japan . |
| 1-63021 | 3/1989 | Japan . |

OTHER PUBLICATIONS

Salmon et al., "Chemical Modification of Conducting Polypyrrole Films", *Mol. Cryst. Liq. Cryst.* 83: 265–276 (1982).

(List continued on next page.)

*Primary Examiner*—Frank Sever
*Attorney, Agent, or Firm*—Nilsson, Robbins, Dalgarn, Berliner, Carson & Wurst

[57] ABSTRACT

Dopable, fully dense polymer membranes are used to form membranes having selective permeabilities. To improve selectivity, the membranes may be subjected to chemical or electrochemical treatment with electron donors or acceptors to alter the doping level of the polymer membrane, generally in a reversible fashion. This leads to significant changes in gas permeation rates relative to what is observed for the non-doped, fully dense polymers. This change in doping level of the polymer films can be precisely controlled by varying the concentration and nature of chemical dopants used. Desirable changes in permeation rates are achieved by a treatment which comprises a reversal doping of the polymeric material, followed by removal of the dopants (to provide an "undoped" polymer). Further addition of controlled amounts of at least one dopant species to the undoped polymer by a second, "redoping" procedure can still more dramatically change the permeability of large species, leading to particularly large separation factors.

23 Claims, 2 Drawing Sheets

OTHER PUBLICATIONS

Turillon et al., "New Electrochemically Generated Organic Conducting Polymers", *J. Electroanal. Chem.*, 135: 173–178 (1982).

Waltman et al., "Electrochemical Studies of Some Conducting Polythiophene Films", *J. Phys. Chem.*, 87: 1459–1463 (1983).

Tourillon et al., "Morphology of Conducting Organic Polymers: Polythiophene and Poly(3-Methyl Thiophene)", *J. Poly. Sci.*, 22: 33–39 (1984).

Krische et al., "Composites of Conducting Polymers: Polyacetylene-Polypyrrole", *Mol. Cryst. Liq. Cryst*, 121: 325–329 (1985).

Wu-Song Huang et al., "Polyaniline, a Novel Conducting Polymer", *J. Chem. Soc., Faraday Trans.* 1, 82: 2385–2400 (1986).

Lu et al., "Morphological Investigation of Polyaniline," *Synthetic Metals* 30:87–89 (1989).

Wan, "The Influence of Polymerization Method and Temperature on the Absorption Spectra and Morphology of Polyaniline," *Synthetic Metals* 31:51–59 (1989).

MEMBRANES HAVING SELECTIVE PERMEABILITY

This invention was made with Government support under Contract No. F4962-086-C-0060 awarded by the Air Force Office of Scientific Research and the National Science Foundation Grant No. CHE-86-57822. The Government has certain rights in the invention.

BACKGROUND OF THE INVENTION

The present invention relates to synthetic polymeric compositions. In particular, the present invention relates to the preparation of polymer membranes and the use thereof in the separation of components of gas mixtures, the separation of ions in aqueous solutions, and similar applications.

There is an ever-increasing need for improved techniques for the efficient and rapid separation of the components of mixtures. In particular, techniques for the separation of components of gaseous mixtures have many significant technical applications. Oxygen separated from the air is utilized in medical applications and enrichment of combustion processes. Nitrogen is used to protect perishables and air-sensitive materials. The removal of carbon dioxide and hydrogen sulfide from natural gas reduces pollution; the carbon dioxide may further be used for tertiary oil recovery. Methane reclaimed from landfills and mines can provide useful fuel. With improved technology, exhaust gases from internal combustion engines could be separated and recycled.

Membrane-based separation systems in theory offer enormous potential savings in energy over standard techniques (for example, cryogenic processes used for separation of gases). During the past decade, a variety of different membrane systems have been introduced commercially. These have been made possible both by the synthesis of new polymeric materials and by the development of asymmetric membranes, in which a thin skin of polymer with high selectivity is grown on a porous structural polymer support. Although some progress has been made in such membrane technology, there has heretofore been found an inverse relationship between selectivity and permeability. This has significantly limited the range of potential applications for such membranes, and has focused attention on the search for techniques to control the porosity of such membranes.

There have been a number of proposals in the prior art of methods for controlling the porosity of polymeric membranes for use in, e.g., reverse osmosis or ultrafiltration methods. For example, U.S. Pat. No. 4,452,424 to Tweddle et al. describes preparation of polysulfone cast films which are partially gelled with mineral acid prior to or during a conventional water gelation procedure. By adjusting the concentration of acid, it is alleged that the porous structure of the resulting membrane may be controlled and improved.

U.S. Pat. Nos. 4,717,393 and 4,717,394 to Hayes describe the preparation of crosslinked polyimide gas separation membranes which exhibit superior selectivity relative to uncrosslinked polyimides. The selective permeabilities observed are attributed to optimization of the molecular free volume in the polymer.

U.S. Pat. No. 4,761,233 to Linder et al. describes the casting of membranes from solutions comprising mixtures of at least one pore-forming polymer and at least one film-forming polymer. The pore-forming polymer is selected as one which if cast alone would contract to form either large pores or a non-uniform distribution of material.

While these materials have some utility with respect to separation of components of some types of mixtures, they have heretofore been inadequate for many desired separations, in particular for the separation of components of gaseous mixtures. It is known that the molecules of different gases may be differentiated on the basis of their kinetic diameters, which are calculated from measurements of the thermodynamic properties of each gas. For example, the following values for kinetic diameters (in Angstroms) have been reported: $He=2.6$; $H_2=2.89$; $Ne=2.75$; $Ar=3.40$; $O_2=3.46$; $N_2=3.64$; $CO_2=3.3$; and $CH_4=3.8$. In theory, any two gas molecules having different kinetic diameters could be separated on the basis of this difference in size.

In practice, however, achievement of this goal has been difficult at best, particularly when the difference in kinetic diameters is relatively small. Thus, there is a need for membranes with higher separation factors, i.e., ratios of the permeability of one gas to another through the membrane. For example, the best separation factors reported in the literature for mixtures comprising $O_2/N_2$ and $CO_2/CH_4$ are 16 and 60, respectively.

Through the use of known techniques, it has heretofore been possible to vary the density of polymer films over a fairly broad range. In particular, various polymers possessing pi conjugation, such as the polyaniline family of polymers, may be cast from solution or hotpressed into fully dense films or otherwise processed into hollow fibers or asymmetric membranes.

It is also known that certain polymer systems which are electrically insulating as formed may be modified subsequent to their preparation by acid doping, or by chemical or electrochemical n- or p-doping to render the polymers electrically conductive. In this context, by dopant is meant a guest species which maintains electrical neutrality in the host polymer, while altering the pi electron density of the polymer and/or its morphology. The dopant species forms coordinate covalent and/or ionic bonds.

Thus, U.S. Pat. Nos. 4,851,487 (Yaniger et al.), 4,806,271 (Yaniger et al.), 4,798,685 (Yaniger) and 4,822,638 (Yaniger) describe application of a covalent doping agent to a base-type non-conductive polymer substrate containing carbon-nitrogen linkages to convert the substrate to an electrically conductive polymer. The products are described as useful in the preparation of electronic devices.

U.S. Pat. No. 4,615,829 to Tamura et al. describes an electroconductive organic polymer containing an electron acceptor as a dopant and consisting essentially of a linear polymer having as a main repeating unit a quinonediimine structure. According to Tamura et al., this polymer is prepared by oxidative or electro-oxidative polymerization of an aniline compound or a water-soluble salt thereof in a reaction medium containing a protonic acid. The product is a conductive polymer which exhibits stability without an additional doping step, because it allegedly has already undergone doping during the course of the oxidative polymerization. Tamura et al. suggests that the polymer may be chemically compensated with ammonia, whereby it undergoes significant loss of electroconductivity; if this polymer is then doped with an electron acceptor such as sulfuric acid, the original high electroconductivity is restored. There is described a process wherein the polymer is produced by first reducing the electroconductive organic polymer with a reducing agent and then oxidizing and simultaneously doping the reduced polymer with an oxidizing agent which is effective as an electron acceptor; in this manner, the dopant may be replaced by a different dopant such as a halogen or Lewis acid. While no particular utility for the electroconductive polymers of Tamura et al. is disclosed, it is apparent from the specification that the salient feature of the subject materials is an electroconductivity of not less than $10^{-6}$ S/cm.

It is an object of the present invention to provide membranes for use in the separation of the components of various mixtures, and in particular for the separation of the components of gaseous mixtures.

It is another object of the present invention to provide methods for treatment of an as-synthesized polymer to improve its utility as a membrane for use in the separation of components of various mixtures, in particular mixtures of gases.

Another object of the present invention is the selective modification of conjugated fully dense polymer membranes, such as polyaniline, for specific and selective gas separations, thereby enabling selection of one species over others in a mixture.

Another object of the present invention is to enable control of the separation of components of a mixture using a polymer membrane which may be modified by in situ treatment methods.

Still another object of the invention is to provide conjugated polymer/nonconjugated polymer or conjugated/semiconjugated fully dense polymer blends, copolymers, and polymer alloys.

Yet another object of the invention is to enable control of the average pore size of the polymer membrane.

SUMMARY OF THE INVENTION

In accordance with the present invention, membranes useful in separations of components of various types of mixtures are prepared from dopable polymers which are fully densified (e.g., by solution casting, hot-pressing into thin films, or film formation from polymer precursors). In general, such membranes comprise at least one layer of at least one dopable, fully dense polymer.

In a preferred embodiment of the invention, such dopable polymer membranes are subjected to chemical or electrochemical treatment with electron donors or acceptors to introduce a dopant into, or alter the doping level of, the polymer membrane; generally, this doping is carried out in a reversible fashion. Pursuant to the present invention, significant changes in the as-formed polymer film's morphology are observed after treatment with chemical or electrochemical dopants. This leads to significant changes in gas permeation rates relative to what is observed for the non-doped, fully dense polymers. This change in doping level of the polymer films can be precisely controlled by varying the concentration and nature of chemical dopants used.

Moreover, desirable changes in permeation rates may be achieved by a treatment which comprises a reversible doping of the polymeric material, followed by removal of the dopants (to provide an "undoped" polymer). Further addition of controlled amounts of at least one dopant species to the undoped polymer by a second, "redoping" procedure can still more dramatically change the permeability of large species, leading to particularly large separation factors.

DETAILED DESCRIPTION OF THE INVENTION

Pursuant to the present invention, membranes comprising at least one layer of at least one fully dense, dopable polymer (as herein defined) are provided for use in the separation of components of various mixtures. It has been determined that such fully dense, dopable polymer compositions exhibit significant utility ab initio for the preparation of membranes which may be employed in, e.g., the separation of gases having different kinetic diameters.

Pursuant to a preferred embodiment of the invention, membranes comprising at least one fully dense, dopable polymer are treated subsequent to the formation thereof with at least one suitable dopant. In addition to inducing a transition from the insulating to the conducting regime, it has been determined that the doping process also results in modification of the transport properties of the resulting membrane. Depending on the nature of the dopant material employed for rendering the membrane conductive (for example, the acid strength, the electronegativity and the size of the resultant dopant ions) and the level of doping effected, it is possible in accordance with the present invention to selectively modify the transport properties of the membrane.

Although the present invention is broadly directed to the use of fully dense polymer membranes having selective permeability ab initio or modified permeability due to the introduction of one or more types of dopants, it has further been determined that the thus-treated polymers may be used to prepare membranes having in many instances even more desirable properties after a subsequent treatment regimen. Thus, in accordance with a further aspect of the present invention, a fully dense polymer which has been treated with at least one first dopant in a reversible manner is further modified by removal of at least a portion of the first dopant ion. Subsequent to removal of the dopant to provide a substantially undoped polymer, the resultant membrane exhibits permeabilities which in many instances differ significantly from what is observed with the polymers as formed (i.e., prior to any doping treatment).

In accordance with a particularly preferred aspect of the present invention, a substantially undoped polymer membrane (i.e., a membrane which has been treated to remove at least a portion of a first dopant) is subjected to a redoping procedure to again introduce at least one dopant. The redoping procedure may employ the same dopant as was utilized in the initial doping treatment; alternatively, a different dopant or combination of dopants may be employed to provide membranes having the desired permeability properties. It has been determined that a combined doping/undoping/redoping procedure permits the preparation of membranes having permeability properties (in particular, gas permeabilities) which are remarkably different from those exhibited by the as-prepared membranes. In particular, the resultant membranes have separation factors for the components of various gaseous mixtures which are significantly higher than any heretofore observed for polymer membranes of comparable dimensions.

Particularly suitable for use in accordance with the present invention are polymers which contain at least a partial conjugated pi system. The most important conjugated dopable polymers comprising a single type of repeating unsaturated unit are the following: polyacetylene, $(CH)_x$; polythiophene, $(C_4H_2S)_x$; polypyrrole, $(C_4H_3N)_x$; polyparaphenylene, $(C_6H_4)_x$; and polyaniline, $(C_6H_5N)_x$. These polymers may be characterized by an extended conjugated system of pi electrons. Many substituted derivatives of the monomeric materials on which the above-noted homopolymers are based, as well as mixtures of such monomer units to give copolymers or blends (polymer alloys), may also be employed to produce polymers which are amenable to treatment with one or more dopants in accordance with the present invention.

In addition to polymers having extended conjugated pi systems, it is known that certain types of polymers with nonconjugated backbones are also amenable to doping [see, e.g., Thakur, M., Makromolecules 21:661 (1988)]. For example, a polymer containing isolated double bonds with electrondonating groups attached, such as synthetic or natural rubber (cis- or trans-polyisoprene) can be reversibly doped with, e.g., iodine or bromine. Thus, in the context of the present invention, by a dopable polymer is meant a polymeric composition (whether conjugated or unconjugated) which is amenable to a doping treatment with an electron donor or acceptor.

In general, all redox active conjugated polymers (including polyacetylene, polyparaphenylene, polypyrrole, polythiophene and derivatives thereof) are oxidized or reduced on p- or n-doping, respectively. Incorporation of counteranions or countercations thus serves to maintain charge balance. Polyaniline in, e.g., its emeraldine oxidation state is different, in that it is already partially oxidized; hence, the addition of acids (such as Lewis or Bronsted acids) renders the material conducting without redox chemistry.

As well as being dopable, an as-produced polymer suitable for use in accordance with the present invention is essentially fully dense. The as-formed fully dense polymer films, membranes or fibers typically possess an average pore size distribution of less than about 20 Å in diameter as determined by techniques such as the BET method ($N_2$ gas adsorption). For purposes of the present invention, a fully dense polymer generally has a density as formed of at least 90% of theoretical density; preferably, the density is greater than about 95%, and most preferably greater than about 99%, of theoretical density. For example, a typical film suitable for use in accordance with the present invention had a measured true density of 1.3090 $g/cm^3$ by helium pycnometry (whereby density is measured without counting pores filled by helium); when the density was determined by weighing a 2 $cm^2$ piece of film and measuring its thickness, the density (including void spaces) was determined to be 1.3190 $g/cm^3$. Thus, the percent of experimental density was 99.2%.

Although they are amenable to doping, many of the above-noted conjugated polymers are porous in film form to all gases. As a consequence, such polymers would be of limited use as the basis for preparation of membrane separators. For example, certain electrochemically synthesized films such as polyparaphenylene and polypyrrole films have been found to be unsuitably porous. Of the chemically synthesized films, polyacetylene synthesized using a Ziegler-Natta catalyst $[Ti(OBu)_4$ and $Al(Et)_3]$ is porous; the coherent films are only ⅓ full density. Of the derivatized films, poly-3-octylthiophene is porous. Of the copolymers, polythiophene vinylene has been found to be porous.

On the other hand, other monomers and monomer mixtures may be employed to prepare fully dense polymers. Such fully dense materials in general have some gas separating abilities ab initio; it is this ability which is exploited in accordance with the present invention, and effectively enhanced in accordance with preferred embodiments of the present invention. Examples of polymers which can be made fully dense include: polyaniline; polyacetylene made by the Durham method [see, e.g., Feast, W. J. and Winter, J. N., J. Chem. Soc., Chem. Commun., 1985, p. 202; EP-A-0 173 473] or the Grubbs method-ring opening metathesis polymerization (ROMP) of cyclooctatetraene [Ginsburg, E. J. et al., J. Am. Chem. Soc. 111:7621 (1989)]; polythiophene; and polypyrrole. In principle, any fully dense polymer having an extended and/or partial conjugated pi electron system so as to be amenable to a doping treatment is contemplated as suitable for use in the preparation of the novel products in accordance with the present invention.

While not wishing to be bound to any particular theory, it is believed that the substantial increase in separation factors achieved in accordance with the present invention is due to the effects of the introduction, removal and/or reintroduction of dopant ions on the interconnected porosity of the polymer. In particular, introduction of a dopant is believed to modify the network of interconnected pores in the polymer in an essentially irreversible manner. Upon removal of the dopant species, the membrane exhibits a novel porous structure unlike that of the as-formed membrane. Further treatment with one or more suitable dopants permits additional selective modification of the membrane structure, leading in many instances to membranes exhibiting heretofore unattainable selectivities with respect to molecular size (for example, the kinetic diameter of gas molecules).

A schematic representation of the speculated effects of doping on pore connectivity is shown in FIG. 1, which illustrates a cross-section of polymer membrane. The polymer is illustrated in FIG. 1(A) in its as-cast form with no dopant addition. FIG. 1(B) illustrates the polymer as heavily doped. FIG. 1(C) illustrates the polymer in undoped form (i.e., after removal of the dopant from the system depicted in FIG. 1(B)). Finally, FIG. 1(D) illustrates the polymer of FIG. 1(C) after it has been lightly redoped.

Figure 1A:
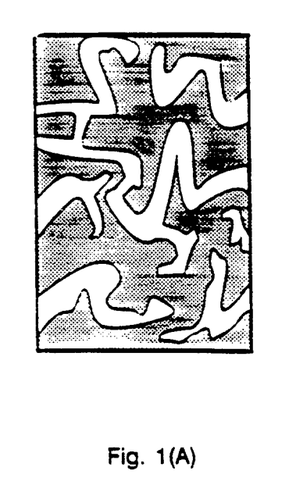
FIGS. 1(A)-1(D) are schematic representations of the as-formed inventive membranes and of the effects of doping, undoping and redoping in accordance with the present invention on pore connectivity.

The as-cast, fully dense film of FIG. 1(A) typically has some permeability to gases. This permeability is size dependent; as a result, the as-formed film exhibits modest separation ratios for gases having different kinetic diameters. This suggests that there is a limited amount of interconnected porosity in the polymer as formed, whereby the film is permeable to some (generally, low diameter) molecules. Doping the film as illustrated in FIG. 1(B) reduces the permeability of all molecules; in addition, it is suspected that some dopant species may occupy locations in the polymer in between non-interconnected pores, as may seen by comparison of FIG.

Figure 1B:
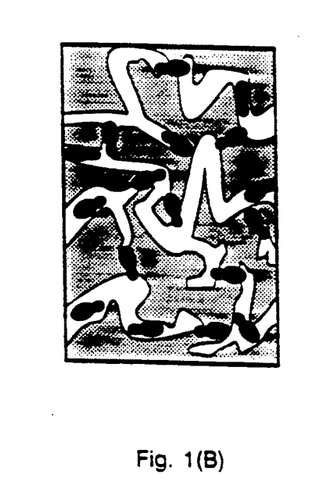
Figure 1C:
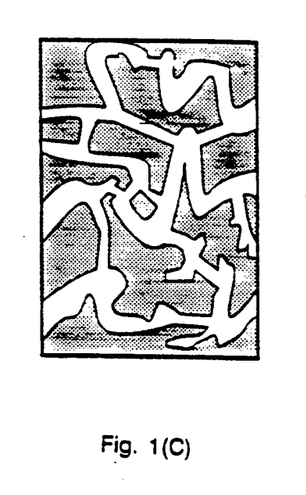
Figure 1D:
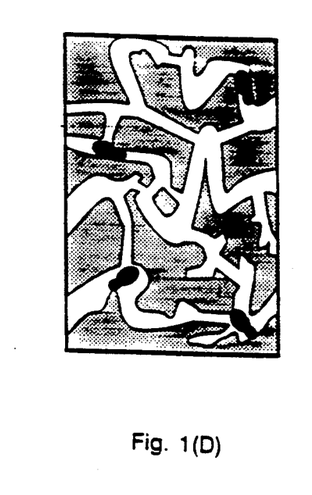

1(A) with FIG. 1(B). As illustrated in FIG. 1(C), undoping the film is believed to result in a greater degree of interconnected porosity, although the relative dimensions of the newly-introduced channels may be substantially smaller than those found in the asformed material; this leads to an increase in the permeability of small molecules relative to the as-cast film. Finally, as shown in FIG. 1(D), light redoping blocks the permeability of the film to larger molecules (e.g., by closing or partially closing the larger channels of interconnected porosity). This leads to very high separation ratios.

With regard to the exemplary polyaniline films, it is believed that the most important criteria for preparation of optimal membranes are selection of the dopant species (i.e., choosing a proper sized dopant species with the appropriate acid strength and/or redox potential) and control of the doping/redoping process (i.e., employing the appropriate concentration of dopant). For example, precise control of the film's morphology can be achieved by adjusting one or more of the following: the molarity of the acids employed; the concentration of the redox doping agents; or the number of coulombs passed during electrochemical doping, especially as a function of time. Other parameters, however, may also be varied to modify the properties of the resultant film. These include: cure time for film formation; use of derivatives of polyaniline (such as 2-ethyl polyaniline) [Leclerc, M. et al., Macromolecules 22:649 (1989)]; the molecular weight of the polymer; and electrochemical doping or electrochemical-assisted doping. It is further possible to change the oxidation state of the polymer; thus, while use of the emeraldine form (the 50% reduced form) is exemplified, the fully reduced leucoemeraldine, 75% reduced protoemeraldine, 25% reduced nigranaline and 0% reduced or fully oxidized pernigraniline could also be used.

The range of alternative formulations useful in accordance with the present invention may be expanded by the use of various copolymers. Thus, for example, copolymers of aniline and thiophene have been prepared and characterized [Polis, D. W. et al., Macromolecules 23:3231 (1990)]. In addition, blends of various polymers may be employed, such as blends of polyaniline and other conjugated polymers including polyaniline derivatives, or blends with nonconjugated polymers such as polyimides or Kevlar. For example, various blends of conducting polymers in insulating host polymers have been described [see, e.g., Wang, H. S. et al., Macromolecules 23:1053 (1990)].

Further, the polymeric material may be employed in a variety of product shapes and forms. Typically, fully dense polymer films are formed by solution casting from soluble monomers or precursor polymers, or by forming a polymer gel which is then hot-pressed. The fully dense free-standing films prepared in this manner typically have thicknesses ranging from about 1000 Å ($10^{-4}$ mm) to about 1 mm; in the following experiments, for example, films with a thickness on the order of about 0.1 mm were employed. Other formulations of the final product may, however, be more suitable for particular uses. For example, polyaniline may be spun into hollow fibers or formed into asymmetric membranes, which have important applications in current gas separation technologies. In particular, the use of asymmetric composites wherein the novel modified polymer is used to form a thin skin on the surface of a porous substrate further enhances the throughput of gas without sacrificing the selectivity of the separation. Asymmetric composites may be easily made from a solution of the polymer by dipping or spraying a suitable substrate of either flat or tubular configuration. Thus, for example, spin coating or spraying may be used to produce polymer skins having a thickness in the range of about 100 Å to about 100,000 Å; typically, asymmetric membranes are formed by coating a thin dense film (on the order of, e.g., about 1000 Å) onto a porous support. The possibility of forming similar composites with other fully dense, dopable polymers further expands the range of applications for the compositions of the instant invention.

Pursuant to a particular embodiment of the invention, the permeability of the inventive membranes may be modified in situ by blending in small amounts of a gaseous dopant with the permeant. In this manner, the properties of the membrane may be further optimized during the actual separation process. As an example, a gas separating system optimized originally for separations at 25° C. could be reoptimized for use at 40° C. without removing the separation system from service.

Morphological changes that result in improved gas selectivities may be produced in conjugated base-type polymers (such as polyaniline) by exposure to either Bronsted or Lewis acids. The former induce protonic acid doping of the nitrogen atoms along the polymer backbone to form covalent N-H bonds. The most generalized formula for the Bronsted acids is H-X. X dissociates to form one of two species: an inorganic anion $X^-$, such as fluoride ($F^-$), chloride ($Cl^-$), bromide ($Br^-$), iodide ($I^-$), bisulfate ($HSO_3^-$), nitrate ($NO_3^-$), perchlorate ($ClO_4^-$), etc.; or an organic anion $X^-$, such as brosylate ($BrC_6H_4SO_3^-$), tosylate ($CH_3CH_6H_4SO_3^-$), acetate ($CH_3CO_2^-$), formate ($HCO_2^-$), etc. Selection of a suitable Bronsted acid on the basis of, e.g., the size of the anion desired for a given system would be well within the skill of those working in the field.

Similar changes can be effected in the polymer films by reaction with acids that accept electron density (Lewis acids) from, e.g., the lone pair of the polyaniline nitrogen to form carbon-nitrogen, silicon-nitrogen, sulfur-nitrogen, oxygen-nitrogen, phosphorous-nitrogen, etc., coordinate covalent bonds during the doping process. These Lewis acid compounds may be represented as $R_3OX$, $R_2SO_4$, $R'SO_2Cl$, etc., wherein R or R' is alkyl or alkenyl (for example, of 1 to 20 carbon atoms), or is aryl or aralkyl (e.g., tosyl, benzyl, tolyl, xylyl or other aromatic groups). X represents anionic species such as chloride ($Cl^-$), fluoride ($F^-$), iodide ($I^-$), bromide ($Br^-$), hexafluorophosphate ($PF_6^-$), hexafluoroarsenate ($AsF_6^-$), benzene sulfonate ($C_6H_4SO_2^-$), etc. Similarly, sulfonic anhydrides (R-$SO_2$-O-$SO_2$-R') or carbonyl anhydrides (R-CO-O-CO-R') may be used as alkyl Lewis acids; in these formulas, R and R' may be the same (e.g., as in tosylic anhydride or 5-norbornene-2,3-dicarboxylic anhydride) or different.

Exemplary Lewis acids which may be employed in accordance with the present invention include the following: benzene sulfonyl chloride, p-toluene sulfonyl chloride, p-toluene sulfonic anhydride, trimethyl silyl chloride, benzyl bromide, 4-bromo-1-butene, chlorophenyl methyl ketone, 1,4-dichlorothionyl-benzene, dimethyl sulfate, methyl sulfate, methyl iodide, trimethyl oxonium tetrafluoroborate, p-toluenesulfonyltriflate, aluminum trichloride ($AlCl_3$), boron trichloride ($BCl_3$), copper chloride ($CuCl_2$), tungsten hexacarbonyl ($W(CO)_6$), etc. As this representative list illustrates, there is available an extremely broad range of suitable Lewis acids which may be employed in accordance with the inventive method. The selection of suitable dopant materials by those working in the field would be routine, as virtually any desired anion or cation may be provided in the form of a Lewis or Bronsted acid.

The dopants are selected based on size, acid strength, redox potential, etc. This enables modification of the porosity of the polymer film for the desired gas separation. As is well known to those of ordinary skill in the art, a wide range of inorganic and organic ions may suitably be used as dopants for particular polymer compositions. The dopants are reacted with the polymer within the gas or liquid phase and/or by electrochemical methods in a manner known per se.

Typically, a dopant is introduced at a level within the range of about 0.001 mol % to about 50 mol % per repeating (dopable) unit in the polymer; preferably, the dopant is present at a level in the range of about 10 mol % to about 50 mol %, and more preferably at a level greater than about 25 mol % per repeating unit. Most preferably, the dopant level is close to 50 mol % to maximize gas permeabilities upon a subsequent undoping. Thus, for example, a preferred value for initial doping of polyaniline in its emeraldine oxidation state is 50 mol %; this corresponds to 1 dopant for every 2 monomeric units, and reflects the fact that only every other nitrogen in the polymeric system can be oxidized.

With reference in particular to the exemplary free-standing fully dense polyaniline films described herein, the initial doping may be carried out in concentrated (e.g., 4M) acid for a suitable period of time (e.g., about 6 hours); this results in the formation of a product having about a 50 mol % dopant concentration. The dopant concentration of the resultant product may be determined by a variety of techniques, including elemental analyses, gravimetry (i.e., weight uptake), counting coulombs during electrochemical doping, and using concentration vs. pH curves at equilibrium [see. e.g., Chiang, J. -C. and Macdiarmid, A. G., Synthetic Metals 13:193 (1986)].

Dopant removal (to prepare a substantially "undoped" polymer) may suitably be effected using, e.g., an aqueous base solution (for example, 1M $NH_4OH$) to remove substantially all of the dopant. Typically, as determined by the previously discussed methods, the undoped polymer after treatment with base has a residual dopant concentration of less than about 0.01 mol %. As a result of the inventive doping/undoping treatment, however, the permeability properties of the polymer are substantially different from, e.g., a polymer which has simply been doped to a comparable level.

The redoping concentration is suitably within the range of about 0.01 mol % to about 5 mol %, and preferably on the order of about 0.1 mol %. It has been determined that such redoping concentrations are effective for lowering the permeabilities of larger gases. These dopant concentrations are achieved using, e.g., 0.001M–1M acid solutions (with solutions on the order of about 0.02M being preferred).

While the separation of the components of gaseous mixtures is discussed in greater detail herein, the membranes of the present invention also clearly have utility in connection with a variety of other types of separations, such as the separation of ions in solution (i.e., separations in the condensed phase). Thus, for example, an electrochemical separation cell may be prepared using a membrane in accordance with the present invention to divide a permeant electrolyte from a feed electrolyte. An electric field is used to drive smaller ions (e.g., $Na^+$ or $K^-$) to the permeant side, while larger ions (e.g., $Cs^+$, $Am^{3+}$ or $Pu^{4+}$) unable to pass through the membrane would be retained on the feed side. The ability to employ a membrane in accordance with the present invention to separate ions in solution on the basis of size also has numerous applications well known to those of skill in the art. A particularly valuable application of such a membrane is in the processing of low and medium level nuclear waste, as generally discussed in Cecille, L. and Toussaint, J. C., *Future Industrial Prospects of Membrane Processes*, Elseview Science, New York, N.Y. (1989), the entire disclosure of which is hereby incorporated by reference.

The invention will be better understood by reference to the following examples which are intended for purposes of illustration and are not to be construed as in any way limiting the scope of the present invention, which is defined in the claims appended hereto.

EXAMPLE 1

Synthesis of Polyaniline Free-Base Films in the Emeraldine Oxidation State

Aniline is distilled from barium oxide in vacuo. To 1200 mL of a 1 M HCl solution is added 80 mL of aniline (859 mmol) in a 3 L resin kettle. The aniline hydrochloride is chilled to $-3.5°$ C. 46.4 g (216 mmol) of ammonium peroxydisulfate is dissolved in 800 mL of 1 M HCl and cooled to 0° C. The oxidant solution is added dropwise to the resin kettle containing the aniline in a dropwise fashion for 45 minutes by means of an addition funnel. The reaction is allowed to proceed for 1.5 hours with continuous stirring at constant temperature. A blue-black precipitate with a coppery reflective tint is observed after the first few m inutes of the reaction.

The resulting polymer is filtered on a Buchner funnel and washed with 12 L of 1 M HCl and 12 L of deionized water (or until the washing solution is colorless). Care must be taken that the water washing level does not fall below the level of the precipitate on the Buchner funnel until the mother liquor is colorless. The moist cake of emeraldine hydrochloride is then dried and ground in a mortar and pestle.

A 5.0 g batch of polyaniline hydrochloride, in the emeraldine oxidation state, was synthesized following the procedures described above. Following deprotonation of the emeraldine hydrochloride with 4 L of 0.1 M $NH_4OH$, the polymer was dried under dynamic vacuum. It was then manually ground to a very fine powder in an agate mortar and pestle and transferred to an evaporating dish. The mass of polymer was then treated with tetrahydrofuran (THF) by adding the solvent dropwise until the surface of the mass appeared wet. The solvent was allowed to evaporate in the fume hood. The dry powder was subsequently reground in a mortar and pestle, then added to 4 L of 1 M HCl and stirred for one hour. The resulting emeraldine hydrochloride was collected on a Buchner funnel, dried under vacuum, and reground in a mortar and pestle. It was then treated through 3 more identical base-THF-acid cycles as described above to give a soluble emeraldine base powder used in film formation. The whole batch was then dried under dynamic vacuum for 24 hours at room temperature and stored in a desiccator for further use.

Exactly 5.02 g of this emeraldine base powder was added to an evaporating dish. Approximately 30 mL of THF was added dropwise to the surface of the polymer powder by means of a pipet. After the mixture had swollen with ether, it was allowed to dry in the fume hood. 20 ml of N-methyl-pyrrolidone (NMP) was added to a mortar. Small increments of emeraldine base were mixed into this solvent and ground with a pestle until a homogeneous viscous solution was obtained. Another 20 mL of NMP was added to the mixture with continuous grinding. The remaining mass of emeraldine base was incrementally added and the solution was ground in the mortar and pestle for 45 minutes. During this period another 10 mL of NMP was added to give a final volume of 50 mL.

At the end of that time the very viscous solution of polyaniline base was processed into thin films by pouring the solution into glass petri dishes and curing them at 125° C. for 3 hours. This homogeneous solution of dissolved polymer was also suitable for film casting with a spreader bar on glass plates and cured at the same temperature.

The cast film plates or petri dishes were immersed in a plastic developing tank that contained deionized water. This procedure facilitated removal of the extremely adhesive as-cast films. The resulting films exhibited excellent mechanical properties, were environmentally stable, and are robust enough to withstand at least a pressure differential of 150 psi.

EXAMPLE 2

Use of Modified Polyaniline Films in Separation of Gases

Various membranes were prepared in accordance with the method of Example 1 and evaluated with respect to their utility in separating the components of gaseous mixtures. In general, the permeability of the various gases was measured in each instance for the as-formed film and compared to the values measured after chemical or electrochemical doping.

Emeraldine films were doped with 4 M halogenic acid solutions, each for 6 hours. Following washes of the treated films with deionized water, the samples were dried under dynamic vacuum for 12 hours, and then evaluated for gas permeabilities.

The samples were then placed into a solution of 1 M aqueous ammonium hydroxide for 10 hours. Following washes with deionized water, the films were dried under dynamic vacuum for 12 hours. The samples were then reevaluated for gas permeabilities.

Further improvements in the separation ability of the doped/undoped films were achieved by allowing the films to equilibrate for 6 hours in dilute solutions of HCl at concentrations in the range of 0.005 to 0.020 M. In this manner, at least a partial redoping of the modified polymer films was achieved.

The electrochemically assisted doping process employs a Ag/AgCl reference electrode used as a cathode, with the polymer film as the anode of an electrochemical cell. 4 M HCl was employed as both the dopant and the electrolyte solution. As a typical example, a 3 cm$^2$ sample of film was doped at +17.38 V versus the reference electrode for 2.5 hours, allowing 1.20 coulombs of charge to pass. The electrochemically-assisted film was then further processed in the same manner as the chemically doped films.

Figure 2:
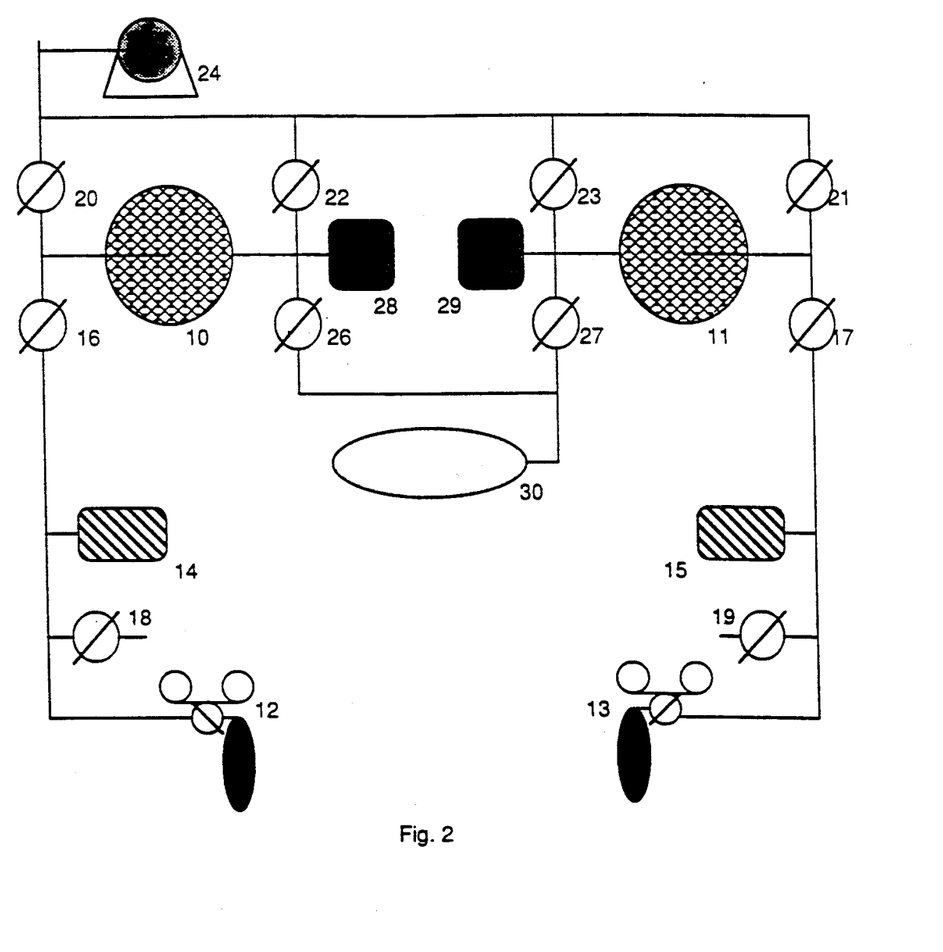
FIG. 2 illustrates a system for use in evaluating the permeability of a membrane to components of a gaseous mixture.

A system designed and built for pure gas permeability measurements utilizing the manometric method (i.e., constant permeation volume) to measure the gas flux through the polymer film is illustrated in FIG. 2. Further details concerning the construction and operation of such systems may be found in, e.g., ASTM Designation 01434-82, "Determining Gas Permeability Characteristics of Plastic Film and Sheeting," Annual Book of ASTM Standards (1982) and O'Brien, K. C. et al., J. Memb. Sci. 29:229 (1986), the entire disclosures of which are hereby incorporated by reference.

As illustrated in FIG. 2, the test system comprises a pair of cells 10 and 11. Individual gas supplies 12 and 13 are provided for each cell, as are associated gas feed transducers 14 and 15. Interposed between the respective gas supplies and the cells are gas feed valves 16 and 17. In addition, individual gas purge valves 18 and 19 are associated with cells 10 and 11, respectively.

Upstream valves 20 and 21 and downstream valves 22 and 23, respectively, permit the opening and closing of appropriate lines for evacuation of the cells using associated evacuation means 24. Each cell is further provided with respective sample injection valves 26 and 27. Permeant transducers 28 and 29 are also provided for each cell.

Using cell A to illustrate the operation of the system, the membrane sample is initially degassed by opening valves 20 and 22 to the high vacuum source (i.e., evacuation means 24). The valves are then closed and a series of references measurements (leak rate determinations) are made by recording the pressure rise with time using the permeant transducer 28. This data is analyzed by the computer and the test continued if the data is acceptable. Valves 20 and 22 are opened again to evacuate the sample and valve 18 is opened to purge out the gas feed line from gas supply 12. All three valves are then closed and valve 16 is opened to admit the test gas at a fixed pressure (e.g., 40 psi) to the upstream side of the membrane. As the test progresses, the permeant gas accumulates in the downstream volume between the membrane, the permeant transducer and valves 22 and 26. The pressure versus time data is again analyzed by the computer; if the data is within the preset accuracy (e.g., 5% relative standard deviation), the test is automatically stopped. Valve 16 is closed and valves 20 and 22 opened to prepare the membrane for the next test. The volumes of the test cells on the downstream side of the membrane were calibrated by gas expansions from a cylinder 30 of known volume using valves 26 and 27 prior to membrane testing. The permeability values are calculated by the computer from the downstream volume, the reference and permeation data, the film thickness and gas feed pressure obtained from gas feed transducers 14 and 15.

In the exemplary system described, the gas feed transducers were a strain gauge type made by Omega Engineering, Stamford, CT. The permeant transducers were high accuracy capacitance manometers made by MKS Instruments, Andover, MA. All valves used in the system were air-operated bellows-seal valves, as are available from, e.g., Nupro, Willouglby, OH. All vacuum tubing in the system Was ¼" or ½" o.d. 304 stainless steel; the gas teed lines were ¼" copper tubing. The entire apparatus was horsed in a small oven with a thermostatic regulator set to maintain a 25° C. environment. The complete operation of the system is suitably controlled by a personal computer (e.g., a Gateway 2000, available from Gateway, Sergeant Bluff, IO) with standard data acquisition and control boards (e.g., as available from Omega Engineering) including statistical analysis and reduction of raw data to permeability. The separation ratios were calculated directly from the permeability measurements.

Table 1 shows that fully dense polyaniline films have different permeabilities for different gases. Thus, such as-formed fully dense films have a baseline ability to separate a small gas such as helium (He) from a large gas such as nitrogen ($N_2$). Throughout, permeability is expressed in terms of barrers: 1 barrer = $10^{-10}$(STP)/cm sec(cm Hg). Doping the film appears to fill some of its pores and decreases the permeabilities of all gases; this doping treatment especially diminishes the permeability of the larger gases, leading to higher He/$N_2$ separation ratios. Undoping the polymer increases the permeability of all gases but especially enhances the throughput of small gases, such as He, leading to even higher He/$N_2$ separation ratios.

TABLE 1

| Polyaniline Membranes Permeabilities (in Barrers) | | | |
|---|---|---|---|
| Gas | As-cast Film | 4M HCl Doped | Undoped |
| He | 4.90 | 2.06 | 11.5 |
| $N_2$ | 0.0382 | <0.005 | 0.00323 |

| He/$N_2$ Separation Factors | | |
|---|---|---|
| As Cast | 4M HCl Doped | Undoped |
| 128.3 | >412 | 3560.4 |

Table 2 also demonstrates that the polyaniline membranes as-cast have different permeabilities with different gases. It further shows that the doping/undoping process can be used to greatly enhance the separation ratio for the important gas pairs $H_2/N_2$, $O_2/N_2$ and $CO_2/CH_4$.

TABLE 2

| | Permeabilities (Barrers) | |
|---|---|---|
| Gas | As-Cast Film | Doped/Undoped |
| He | 3.89 | 11.2 |
| $H_2$ | 3.08 | 11.6 |
| $CH_4$ | 0.0233 | 0.00387 |
| $CO_2$ | 0.421 | 1.30 |
| Ar | 0.0612 | 0.0143 |
| $O_2$ | 0.141 | 0.200 |
| $N_2$ | 0.0149 | 0.00154 |

| | Separation Factors | |
|---|---|---|
| Gases | As-Cast Film | Doped/Undoped |
| $H_2/N_2$ | 206.7 | 7532.5 |
| $O_2/N_2$ | 9.5 | 129.9 |
| $CO_2/CH_4$ | 18.1 | 335.9 |

Table 3 uses another piece of the same film as was employed in the separations reported in Table 2; however, here an electrochemically assisted process was used while doping in 4 M HCl acid solution. As can be seen, this electrochemically-assisted process does not improve the separation factors after undoping in 1 M $NH_4OH$, as compared to chemical doping.

Table 3 also illustrates the effects of redoping with a low concentration of acid. A 0.01 M solution of HCl partially blocks up a few pores, thereby cutting down the permeability of the larger gases, while only slightly decreasing the permeability of the smaller gases. This leads to significant increases in separation factors. A redoping with 0.02 M HCl has an even more dramatic effect on cutting off the passage of large gases, leading to very good separation ratios.

TABLE 3

Polyaniline Membranes

TABLE 3-continued

| | Permeabilities (Barrers) | | | |
|---|---|---|---|---|
| | | Doped/Undoped | Chemically | |
| Gas | As-Cast Film | Electrochemically Assisted | Redoped 0.01M | Redoped 0.02M |
| He | 3.89 | 15.4 | 10.6 | 8.15 |
| $H_2$ | 3.08 | 16.6 | 10.2 | 7.18 |
| $CH_4$ | 0.0233 | 0.928 | 0.0228 | <0.002 |
| $CO_2$ | 0.421 | 2.29 | 0.0749 | 0.0613 |
| Ar | 0.0612 | 0.337 | 0.0190 | 0.0598 |
| $O_2$ | 0.141 | 0.550 | 0.135 | 0.0598 |
| $N_2$ | 0.0149 | 0.407 | 0.0161 | <0.002 |

| | Separation Factors | | | |
|---|---|---|---|---|
| Gases | As-Cast | Doped/Undoped Electrochemically | Redoped 0.01M | Redoped 0.02M |
| $H_2/N_2$ | 206.7 | 40.8 | 633.5 | >3590 |
| $O_2/N_2$ | 9.5 | 1.4 | 8.4 | >29.9 |
| $CO_2/CH_4$ | 18.1 | 2.5 | 3.3 | >30.7 |

Table 4 further illustrates the effects of doping/undoping and redoping. Here the baseline $H_2/N_2$ separation factor is enhanced by doping/undoping which increases the permeability of the $H_2$. Redoping with 0.01 M HCl further increases the separation factor by lowering the $N_2$ permeability. Redoping with 0.02 M HCl greatly enhances the separation factor by further decreasing the permeability of $N_2$.

TABLE 4

| Gas | As-cast Film | Doped/ Undoped | Redoped 0.01M | Redoped 0.02M |
|---|---|---|---|---|
| | Permeabilities (Barrers) | | | |
| He | 9.20 | 13.5 | 5.11 | 3.78 |
| $H_2$ | 8.37 | 13.5 | 3.93 | 2.61 |
| $N_2$ | 0.0569 | 0.0502 | 0.00759 | <0.002 |
| | Separation Factors | | | |
| $H_2/N_2$ | 147.1 | 268.9 | 517.8 | >1305 |

Table 5 shows that using different dopant species leads to different permeabilities. Using 4 M HF, HCl and HBr to dope the polyaniline membrane and then undoping with 1M $NH_4OH$ leads in all cases to higher permeabilities for small gases relative to the as-cast film. HF appears to be the most effective dopant at opening pores and improving connectivity as the highest He and $H_2$ permeabilities are found. HCl is the next most effective dopant, followed by HBr. Doping polyaniline in a 4 M HI solution for 4 hours followed by undoping has only a small effect on gas permeabilities.

TABLE 5

| Effects of Protonic Acid Dopants on Polyaniline Membranes | | | | | |
|---|---|---|---|---|---|
| | Permeabilities (Barrers) | | | | |
| Gas | As-Cast Film | Doped/ Undoped 4M HCl | Doped/ Undoped 4M HF | Doped/ Undoped 4M HBr | Doped/ Undoped 4M HI |
| He | 9.52 | 18.1 | 27.8 | 13.2 | 8.30 |
| $H_2$ | 8.79 | 17.6 | 28.0 | 13.7 | 8.17 |
| $CH_4$ | 0.0156 | 0.0172 | 0.526 | 0.00893 | 0.02 |
| $CO_2$ | 2.00 | 2.60 | 10.2 | 2.34 | 1.87 |
| Ar | 0.121 | 0.183 | 0.758 | 0.116 | 0.113 |
| $O_2$ | 0.413 | 0.546 | 1.82 | 0.380 | 0.356 |
| $N_2$ | 0.0671 | 0.0631 | 0.378 | 0.0318 | 0.0472 |
| | Separation Factors | | | | |
| Gas Mixture | As-Cast Film | Doped/ Undoped 4M HCl | Doped/ Undoped 4M HF | Doped/ Undoped 4M HBr | Doped/ Undoped 4M HI |
| $H_2/N_2$ | 131.0 | 278.9 | 74.1 | 430.8 | 173.1 |
| $O_2/N_2$ | 6.2 | 8.7 | 4.8 | 11.9 | 7.5 |

TABLE 5-continued

| Effects of Protonic Acid Dopants on Polyaniline Membranes | | | | | |
|---|---|---|---|---|---|
| $CO_2/CH_4$ | 128.2 | 151.2 | 21.5 | 262.0 | 93.5 |

Table 6 shows the effects of curing time on permeabilities of the polyaniline mebranes. Large effects are not seen, except that the longer cure times tends to make the films more rigid and less susceptible to improvements by doping/undoping. Hence, the separation factors for the 6 hour cured films did not improve greatly on doping/undoping when compared to the 2 hour and 3 hour cured films. The 3 hour cured films showed the greatest improvement after doping/undoping.

TABLE 6

Effect of Cure Time on Permeabilities of Polyaniline Membranes

| | Permeabilities (Barrers) | | |
|---|---|---|---|
| Gas | 2 Hour Cure | 3 Hour Cure | 6 Hour Cure |
| He | 9.52 | 3.89 | 5.36 |
| $H_2$ | 8.79 | 3.08 | 4.65 |
| $CH_4$ | 0.0156 | 0.0233 | 0.0324 |
| $CO_2$ | 2.00 | 0.421 | 0.952 |
| Ar | 0.121 | 0.0612 | 0.195 |
| $O_2$ | 0.413 | 0.141 | 0.225 |
| $N_2$ | 0.0671 | 0.0149 | 0.0593 |
| Gas | 2 Hour | 3 Hour | 6 Hour |
| | Separation Factors | | |
| $H_2/N_2$ | 131.0 | 206.7 | 78.4 |
| $O_2/N_2$ | 6.2 | 9.5 | 3.8 |
| $CO_2/CH_4$ | 128.2 | 18.1 | 29.4 |
| | After Doping/Undoping | | |
| | Permeabilities (Barrers) | | |
| He | 18.1 | 11.2 | 7.54 |
| $H_2$ | 17.6 | 11.6 | 6.66 |
| $CH_4$ | 0.0172 | 0.00387 | 0.0129 |
| $CO_2$ | 2.6 | 1.30 | 0.559 |
| Ar | 0.183 | 0.0143 | 0.0296 |
| $O_2$ | 0.546 | 0.200 | 0.0984 |
| $N_2$ | 0.0631 | 0.00154 | 0.0169 |
| | Separation Factors | | |
| $H_2/N_2$ | 278.9 | 7532.5 | 394.1 |
| $O_2/N_2$ | 8.7 | 129.9 | 5.8 |
| $CO_2/CH_4$ | 151.2 | 335.9 | 0.1 |

Table 7 reports the results achieved through the use of 1 M tosylic anhydride as Lewis acid dopant. A film of emeraldine base was soaked for 4 hours in a 1 M ethanolic solution of tosylic anhydride. The film was then soaked for 2 hours in a solution comprising 0.5 M tosylic anhydride in a 1:1 mixture of water and ethanol. The film was compensated (i.e., undoped) with 1 M ammonium hydroxide for 6 hours, washed with deionized water, dried under dynamic vacuum for 12 hours, and then evaluated for gas permeability.

TABLE 7

Effects of Lewis Acid Dopant on Polyaniline Membranes

| | Permeabilities (Barrers) | |
|---|---|---|
| Gas | As-Cast Film | Doped/Undoped |
| He | 9.52 | 10.9 |
| $H_2$ | 8.79 | 9.68 |
| $CH_4$ | 0.0156 | 0.0174 |
| $CO_2$ | 2.00 | 1.86 |
| Ar | 0.121 | 0.113 |
| $O_2$ | 0.413 | 0.411 |
| $N_2$ | 0.0671 | 0.0504 |
| | Separation Factor | |

TABLE 7-continued

Effects of Lewis Acid Dopant on Polyaniline Membranes

| Gas Mixture | As-Cast Film | Doped/Undoped |
|---|---|---|
| $H_2/N_2$ | 131.0 | 192.1 |
| $O_2/N_2$ | 6.2 | 8.2 |
| $CO_2/CH_4$ | 128.2 | 106.9 |

The very large separation factors possible with optimized polyaniline membranes in accordance with the present invention may be calculated from the data reported in Tables 1-6. For example, the largest permeabilities have been achieved for $H_2$, $CO_2$ and $O_2$ using 4 M HF doping/undoping of polyaniline (Table 5). Very small permeabilities for $CH_4$ and $N_2$ have been achieved by redoping a previously 4 M HCl doped/undoped membrane with 0.02 M HCl (Table 3). Combining this data gives potential separation factors of >14,000 for $H_2/N_2$, >910 for $O_2/N_2$ and >5,100 for $CO_2/CH_4$, as given in Table 8. Although the redoping process may lower slightly the permeability of $H_2$, $CO_2$ and $O_2$ (which in turn reduces the separation factors), it is readily seen how straightforward optimization procedures based on the concepts described herein can be exploited to provide membranes with enormous separation factors.

TABLE 8

Potential Polyaniline Membrane Separation Factors (HF doping/undoping followed by 0.02M HCl)

| Observed Permeabilities | | | |
|---|---|---|---|
| HF doping/undoping | | 0.02M HCl redoping | |
| $H_2$ | 28.0 | $CH_4$ | <0.002 |
| $CO_2$ | 10.2 | $N_2$ | <0.002 |
| $O_2$ | 1.82 | | |

| Potential Separation Factors | |
|---|---|
| $H_2/N_2$ | >14,000 |
| $O_2/N_2$ | >910 |
| $CO_2/CH_4$ | >5,100 |

EXAMPLE 3

Preparation and Use of Modified Dimethoxyparaphenylene Vinylene (DMPPV) Film

The dopable conjugated polymer dimethoxyparaphenylene vinylene (DMPPV) has been described in the literature [Murase, I. et al., Polymer Commun. 26:362 (1985); Jen, K.-Y. et al., Synth. Metals 22:179 (1987)]. The sulfonium salt polymer precursor to DMPPV was prepared according to Murase et al. by reaction of dimethyl sulfide and 2,5-dimethoxy-p-xylylene dichloride in water with slow addition of base at 5° C. The as-formed precursor sulfonium salt polymer was filtered, washed and then dried under dynamic vacuum. The dried precursor powder was then dissolved in water as a 5% solution and cast on glass plates. This thin film was dried at room temperature under an atmosphere of argon for 2 days. A coherent film of DMPPV was obtained by curing the precursor film at 200° C. for 45 minutes; this process released gaseous HCl and dimethyl sulfide. The thus-prepared film of DMPPV was evaluated for gas permeability. As indicated in Table 9, this fully dense film has a baseline ability to separate gases based on kinetic diameter. The film was then chemically treated by immersion of the film in an anhydrous solution of 0.10 M $FeCl_3$ in nitromethane for 1 hour. The film was then compensated (undoped) with IM ammonium hydroxide for 3 hours, washed with deionized water, dried under dynamic vacuum for 12 hours, and then evaluated for gas permeability. As the results reported in Table 9 demonstrate, the doping-/redoping procedure improves connectivity and increases permeability for all gases tested.

TABLE 9

DMPPV Membranes

Permeabilities (Barrers)

| Gas | As-Cast Film | Doped/Undoped Film |
|---|---|---|
| He | 13.2 | 22.3 |
| $H_2$ | 17.9 | 28.4 |
| $CH_4$ | 0.265 | 1.21 |
| $CO_2$ | 10.6 | 29.8 |
| Ar | 0.605 | 2.01 |
| $O_2$ | 1.6 | 4.17 |
| $N_2$ | 0.301 | 0.889 |

Separation Factors

| Gas Mixture | As-Cast Film | Doped/Undoped Film |
|---|---|---|
| $H_2/N_2$ | 59.5 | 31.9 |
| $O_2/N_2$ | 5.3 | 4.7 |
| $CO_2/CH_4$ | 40.0 | 24.6 |

The test samples were stable for several weeks, after which they cracked. By following a redoping procedure in accordance with a preferred embodiment of the present invention, the permeability of the membrane to large gases may be decreased and higher separation factors obtained.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. A membrane for use in separation of a component from a mixture comprising same, said membrane having selective permeability and comprising a layer of at least one fully dense dopable polymer, wherein said layer has an average pore size distribution of less than about 20 Angstroms in diameter.

2. A membrane according to claim 1, wherein said fully dense polymer has an at least partially conjugated pi electron system.

3. A membrane according to claim 2, wherein said polymer is polyaniline.

4. A membrane according to claim 3, wherein said polyaniline is in an emeraldine oxidation state.

5. A membrane according to claim 1, further comprising at least one dopant in an amount effective to modify the permeability of said polymer as formed.

6. A membrane according to claim 5, wherein said dopant is present in a concentration of about 0.005 to about 50 mol % per repeating unit of said polymer.

7. A membrane according to claim 5, wherein said dopant is selected from the group consisting of Lewis acids, Bronsted acids, inorganic ions and organic ions.

8. A membrane according to claim 7, wherein said dopant is a Lewis acid.

9. A membrane according to claim 8, wherein said Lewis acid comprises a halide anion.

10. A membrane for use in separation of a component from a mixture comprising same, said membrane having selective permeability and ocmprising a layer of at least one fully dense dopable polyer, wherein said layer has an average pore size distribution of less than about 20 Angstroms in diameter, prepared by reversible doping of said fully dense dopable polymer layer with a first at least one dopant.

11. A membrane according to claim 10, wherein said polymer has an at least partially conjugated pi electron system.

12. A membrane according to claim 11, wherein said polymer is polyaniline.

13. A membrane according to claim 10, wherein said polymer is further treated to remove at least a portion of said first at least one dopant to provide a substantially undoped polymer.

14. A membrane according to claim 13, wherein said substantially undoped polymer is further treated to introduce a second at least one dopant.

15. A membrane according to claim 14, wherein said second at least one dopant is the same as said first at least one dopant.

16. A membrane according to claim 14, wherein said second at least one dopant is different from said first at least one dopant.

17. A membrane according to claim 14, wherein at least one of said first and said second at least one dopant comprises a halide ion.

18. A method for preparing a membrane for use in separation of a component from a mixture comprising same, comprising:
   forming a membrane comprising a layer of at least one fully dense dopable polymer, wherein said layer has an average pore size distribution of less than about 20 Angstroms in diameter; and
   treating said layer of said membrane with a first at least one dopant to form a doped membrane.

19. A method according to claim 18, further comprising treating said doped membrane to remove at least a portion of said first at least one dopant, thereby forming an at least substantially undoped membrane.

20. A method according to claim 19, further comprising treating said at least substantially undoped membrane with a second at least one dopant, thereby forming a redoped membrane.

21. A membrane when prepared according to the method of claim 18.

22. A membrane when prepared according to the method of claim 19.

23. A membrane when prepared according to the method of claim 20.

* * * * *